Patented Oct. 3, 1944

2,359,708

UNITED STATES PATENT OFFICE 2,359,708

ALIPHATIC POLYETHER POLYAMIDES

Herman A. Bruson, Philadelphia, Pa., assignor to The Resinous Products & Chemical Company, Philadelphia, Pa., a corporation of Delaware No Drawing. Application April 4, 1942, Serial No. 437,679

6 Claims. (Cl. 260—561)

This invention relates to aliphatic polyether polyamides having the formula—

$$A(O-CH_2-CH_2-CONH_2)_n$$

wherein A is the non-hydroxylated organic residue of an aliphatic polyhydric alcohol having from 2 to 6 (inclusive) hydroxyl groups per molecule, and $n$ is an integer from 2 to 6 inclusive.

These compounds are obtained according to this invention by partial hydrolysis of the corresponding aliphatic polyether polynitriles of the formula—

$$A(O-CH_2CH_2CN)_n$$

where A and $n$ have the above-mentioned significance. These polynitriles in turn are obtained by reacting aliphatic polyhydric alcohols having 2 to 6 hydroxyl groups in the molecule with acrylonitrile in the presence of an alkaline condensing agent, such as sodium or potassium hydroxide, sodium methylate, a quaternary ammonium hydroxide, etc., according to the method described in copending application Serial No. 374,603, filed January 15, 1941, of which the present application is a continuation-in-part. In said application it is shown that polyhydric alcohols, such as ethylene glycol, propylene glycol, trimethylene glycol, tetramethylene glycol, pentamethylene glycol, octamethylene glycol, decamethylene glycol, octadecanediol, divinyl glycol, dipropenyl glycol, glycerol, trimethylol propane-1,1,1, butantriol-2,3,4, pentaglycerol, erythritol, pentaerythrite, mannitol, sorbitol, diethylene glycol, dipropylene glycol, triethylene glycol, thiodiethylene glycol, thiotetraethylene glycol, hexaethylene glycol, nonaethylene glycol, higher polyethylene glycols having molecular weights up to 4000, or other aliphatic polyhydric alcohols are reacted with acrylonitrile in the presence of an alkaline catalyst to form poly-β-cyanoethyl ethers of the polyhydric alcohols.

Typical poly-β-cyanoethyl ethers are shown in the following list—

NC—CH₂CH₂—O—CH₂CH₂—O—CH₂CH₂CN
NC—CH₂CH₂—O—CH₂CH₂—O—CH₂—CH₂—O—CH₂CH₂CN
NC—CH₂CH₂—O—CH₂CH₂—S—CH₂—CH₂—O—CH₂CH₂CN
NC—CH₂CH₂—(O—CH₂CH₂)ₓ—O—CH₂CH₂CN
(where $x$ is 3 or more)
NC—CH₂CH₂—O—C₂H₄—O—C₂H₄—S—C₂H₄—O—C₂H₄—O—C₂H₄CN
NC—CH₂CH₂—O—CH(CH₃)CH₂—O—CH₂CH₂CN
NC—CH₂—CH₂—O—CH(CH₃)CH₂—O—CH₂(CH₃)CH—O—CH₂CH₂CN
NC—CH₂CH₂—O—(CH₂)ₓ—O—CH₂CH₂CN
(where $x$ is 3 or more)

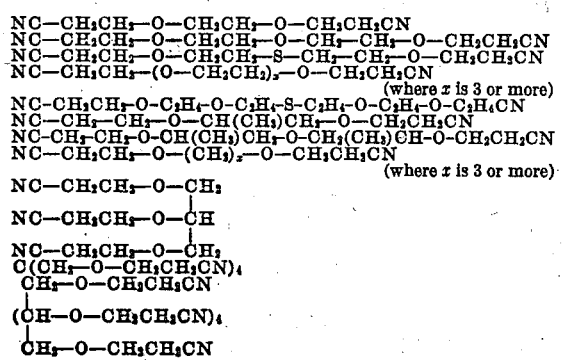

It will be noted that the non-hydroxylated organic residue derived from an aliphatic polyhydric alcohol, corresponding to A in the above general formulae, is an acyclic hydrocarbon chain or an acyclic hydrocarbon chain which is interrupted by oxygen or sulfur to form alkylene chains of at least two carbon atoms each between the oxygen or sulfur atoms.

The partial hydrolysis of such polycyanoethyl ethers is carried out in the presence of sulfuric acid of at least 80% strength. There must be present at least one mol of water for each nitrile group to be hydrolyzed. In general the best results are obtained when one equivalent of both water and acid are present for each cyano group to be hydrolyzed. The hydrolysis is performed at 50° to 100° C. Higher temperatures cause fission at the ether linkages. When the reaction has been carried to the formation of polyamide, the sulfuric acid is neutralized and the polyamide separated.

In view of the proclivity of sulfuric acid to split ethers, it is a surprising result that good yields of ether polyamides are thus obtained. In this connection it is of interest to note that in hydrolyzing the polyether polynitriles, amide formation by strong aqueous alkalies is not feasible, as they cause fission of the molecule at the ether linkages.

The polyether polyamides obtained are new compounds useful for the preparation of plastics. For example, they may be condensed with formaldehyde alone or in conjunction with urea, melamine, aniline, phenol, or similar compounds to give useful resins.

The following examples illustrate the invention. The parts are by weight.

*Example 1.*—A solution of 100 parts of 98% sulfuric acid (1 mol) and 18 parts of water (1 mol) was added dropwise during 1¼ hours to 84 parts (0.5 mol) of di-(β-cyanoethoxy)-ethane $$NCCH_2CH_2-O-CH_2CH_2-O-CH_2CH_2CN$$

while the reaction mixture was stirred and maintained at 70° C. The mixture was then heated for five hours at 70° C., cooled, and neutralized with 25% sodium hydroxide solution at 10–20° C. The solution was cooled to 10° C. and filtered to remove the sodium sulfate. The filtrate was evaporated to dryness on a steam bath at 90–95° C. under reduced pressure. A syrupy residue was obtained which crystalized on standing. It was recrystallized from dioxane to yield a product (56 parts), which separated in colorless needles, having a melting point of 123–124° C. having the formula—

$$H_2NOC-CH_2CH_2-O-CH_2CH_2-O-CH_2CH_2CONH_2$$

and being very soluble in water, but only slightly soluble in cold acetone or dioxane.

The di-(β-cyanoethoxy)-ethane used above is a colorless liquid B. P. 158°/2 mm., obtained by condensing acrylonitrile and ethylene glycol in the presence of aqueous sodium hydroxide solution.

*Example 2.*—A solution of 200 parts of 98% sulfuric acid (2 mols) and 36 parts of water (2 mols) was added dropwise during two hours to 212 parts (1 mol) of bis-β,β'-(2-cyanoethoxy)-diethyl ether,

NC—CH₂CH₂—O—CH₂CH₂—O—CH₂CH₂—O—CH₂CH₂CN while the reaction mixture was stirred and maintained at 65–75° C. The mixture was then stirred and heated at 70° C. for six hours. It was cooled to 10° C. and neutralized dropwise with a 25% sodium hydroxide solution while the temperature was kept below 20° C. The neutral solution was cooled to 8° C. and the sodium sulfate crystals filtered off. The filtrate was freed from water at 90° C. under reduced pressure, leaving a syrupy residue containing some sodium sulfate. The latter was removed by hot vacuum filtration and the filtrate heated with dioxane. When the filtered dioxane solution was cooled, the product separated in colorless crystals in a yield of 165 parts. The compound was purified by recrystallization from dioxane and melted when pure at 103–104°. It has the formula—

H₂NOC—CH₂CH₂—O—CH₂CH₂—O—CH₂CH₂—O—CH₂CH₂CONH₂

It is very soluble in water.

*Example 3.*—A solution of 200 parts of 98% sulfuric acid (2 mols) and 36 parts (2 mols) of water was added dropwise to 174 parts (0.5 mol) of tetra(β-cyanoethoxymethyl)-methane at 70–78° C. during one hour with constant stirring. The mixture was then held at 75° C. for 5 hours. It was then cooled to 15° C. and neutralized by the gradual addition of 25% caustic soda solution under such conditions that the temperature did not exceed 20° C. The product was filtered to remove sodium sulfate and the latter washed with 200 parts of ice water. The combined washings and filtrate were evaporated to dryness in vacuo on a steam bath and the colorless syrup obtained was dissolved in absolute ethanol and filtered to remove traces of salts. Upon removal of the alcohol by evaporation under reduced pressure, 180 parts of product consisting essentially of tetra(β-carbamylethoxy methyl)-methane

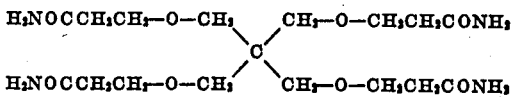

was obtained as a colorless viscous mass.

The tetra(β-cyanoethoxymethyl)-methane used was obtained by reacting pentaerythrite with acrylonitrile in the presence of aqueous potassium hydroxide solution as a catalyst.

*Example 4.*—A solution of 200 parts of 98% sulfuric acid (2 mols) and 36 parts (2 mols) of water was added with constant stirring to one-third mol of hexa-(β-cyanoethoxy)-hexane (obtained from sorbitol and acrylonitrile) while the reaction mixture was maintained at 70–75° C.

The mixture was held at 75–80° C. for five hours, then cooled to 10° C., and carefully neutralized by the gradual addition of 10% caustic soda solution while the temperature was kept below 20° C. The product was filtered at 15° C. and the filtrate evaporated to dryness in vacuo on a steam bath. The residue was dissolved in methanol and filtered to remove traces of salts. Upon removal of the alcohol by evaporation under reduced pressure, the hexa-(β-carbamylethoxy) hexane

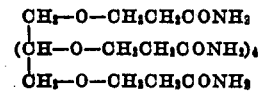

was obtained as a pale resinous water-soluble mass.

In the same manner other polyether polynitriles of the formula A(O—CH₂CH₂CN)ₙ, as described above, can be converted to the corresponding polyamides without scission of the ether linkage.

I claim:

1. A method for preparing aliphatic polyether polyamides having the formula

A(O—CH₂CH₂—CONH₂)ₙ wherein A is the non-hydroxyl portion of an aliphatic polyhydric alcohol having from 2 to 6 (inclusive) hydroxyl groups, and n is an integer from 2 to 6 inclusive, which comprises reacting between 50° C. and 100° C. an aliphatic polyether polynitrile having the formula

A(O—CH₂CH₂CN)ₙ wherein A and n have the above mentioned significance, with one molecular equivalent each of sulfuric acid and water for each cyano group present in the molecule and neutralizing the reaction mixture with alkali.

2. As a new compound, an aliphatic polyether polyamide having the formula

A(O—CH₂CH₂CONH₂)ₙ wherein A is the non-hydroxyl portion of a polyhydric aliphatic alcohol having from 2 to 6 (inclusive) hydroxyl groups, and n is an integer from 2 to 6 inclusive.

3. As a new compound, 1,2-di-(β-carbamylethoxy) ethane having the formula

H₂NOC—CH₂CH₂—O—CH₂CH₂—O—CH₂CH₂CONH₂

4. As a new compound 2,2'-di-(β-carbamylethoxy)-diethyl ether having the formula

H₂NOC—CH₂CH₂—O—CH₂CH₂—O—CH₂CH₂—O—CH₂CH₂CONH₂

5. As a new compound tetra-(β-carbamylethoxymethyl)-methane having the formula

C(CH₂—O—CH₂CH₂CONH₂)₄

6. As a new compound, an aliphatic polyether polyamide having the formula

H₂NOC—CH₂CH₂—(OCH₂CH₂)ₓ—

OCH₂CH₂CONH₂ wherein x is an integer having a value from one to ninety.

HERMAN A. BRUSON.